United States Patent
Karjalainen et al.

(10) Patent No.: US 12,207,102 B2
(45) Date of Patent: Jan. 21, 2025

(54) BEAM REPORTING FOR RANK ENHANCEMENT

(71) Applicant: Nokia Technologies Oy, Espoo (FI)

(72) Inventors: Juha Karjalainen, Oulu (FI); Jorma Kaikkonen, Oulu (FI); Mihai Enescu, Espoo (FI); Sami-Jukka Hakola, Kempele (FI); Timo Koskela, Oulu (FI)

(73) Assignee: Nokia Technologies Oy, Espoo (FI)

( * ) Notice: Subject to any disclaimer, the term of this patent is extended or adjusted under 35 U.S.C. 154(b) by 364 days.

(21) Appl. No.: 17/786,352

(22) PCT Filed: Dec. 29, 2020

(86) PCT No.: PCT/FI2020/050871
§ 371 (c)(1),
(2) Date: Jun. 16, 2022

(87) PCT Pub. No.: WO2021/160926
PCT Pub. Date: Aug. 19, 2021

(65) Prior Publication Data
US 2023/0025326 A1    Jan. 26, 2023

Related U.S. Application Data

(60) Provisional application No. 62/975,933, filed on Feb. 13, 2020.

(51) Int. Cl.
*H04W 16/28* (2009.01)
*H04B 7/06* (2006.01)

(52) U.S. Cl.
CPC .......... *H04W 16/28* (2013.01); *H04B 7/0626* (2013.01)

(58) Field of Classification Search
CPC ...... H04W 16/28; H04B 7/0626; H04B 7/063
(Continued)

(56) References Cited

U.S. PATENT DOCUMENTS

2019/0281485 A1* 9/2019 da Silva ............ H04W 36/0085
2019/0334603 A1   10/2019 Venugopal et al.
(Continued)

FOREIGN PATENT DOCUMENTS

CN    106576265 A    4/2017
CN    109392001 A    2/2019
(Continued)

OTHER PUBLICATIONS

Extended European Search Report received for corresponding European Patent Application No. 20918289.8, dated Dec. 12, 2022, 7 pages.
(Continued)

*Primary Examiner* — Obaidul Huq
(74) *Attorney, Agent, or Firm* — Nokia Technologies Oy

(57) ABSTRACT

Systems, apparatuses, and methods of beam reporting for rank enhancement are provided. One method may include defining an enhanced beam reporting criteria for user equipment (UE) beam reporting. The enhanced beam reporting criteria may be used for transmission rank enhancement. The method may also include configuring at least one user equipment (UE) with the enhanced beam reporting criteria, and receiving at least one beam report, from the at least one user equipment (UE), according to the enhanced beam reporting criteria configured to the at least one user equipment (UE).

18 Claims, 8 Drawing Sheets

(58) Field of Classification Search
USPC .................................... 370/310, 328, 329
See application file for complete search history.

(56) References Cited

U.S. PATENT DOCUMENTS

| | | | | |
|---|---|---|---|---|
| 2021/0051495 A1* | 2/2021 | Gupta | ................ | H04W 72/12 |
| 2021/0235307 A1* | 7/2021 | Venugopal | ............ | H04L 5/0057 |

FOREIGN PATENT DOCUMENTS

| CN | 110268738 A | 9/2019 |
|---|---|---|
| WO | 2018/232090 A1 | 12/2018 |
| WO | 2019/090775 A1 | 5/2019 |
| WO | 2019/102064 A1 | 5/2019 |
| WO | 2019/154009 A1 | 8/2019 |
| WO | 2019/183878 A1 | 10/2019 |
| WO | 2019/212323 A1 | 11/2019 |

OTHER PUBLICATIONS

Office Action received for corresponding Indian Patent Application No. 202247051143, dated Dec. 30, 2022, 6 pages.
"3rd Generation Partnership Project; Technical Specification Group Radio Access Network; NR; Physical channels and modulation (Release 16)", 3GPP TS 38.211, V16.0.0, Dec. 2019, pp. 1-129.
"3rd Generation Partnership Project; Technical Specification Group Radio Access Network; NR; Multiplexing and channel coding (Release 16)", 3GPP TS 38.212, V16.0.0, Dec. 2019, pp. 1-145.
"3rd Generation Partnership Project; Technical Specification Group Radio Access Network; NR; Physical layer procedures for control (Release 16)", 3GPP TS 38.213, V16.0.0, Dec. 2019, pp. 1-146.
"3rd Generation Partnership Project; Technical Specification Group Radio Access Network; NR; Physical layer procedures for data (Release 16)", 3GPP TS 38.214, V16.0.0, Dec. 2019, pp. 1-148.
"3rd Generation Partnership Project; Technical Specification Group Radio Access Network; NR; Radio Resource Control (RRC) protocol specification (Release 15)", 3GPP TS 38.331, V15.8.0, Dec. 2019, pp. 1-532.
International Search Report and Written Opinion received for corresponding Patent Cooperation Treaty Application No. PCT/FI2020/050871, dated Mar. 23, 2021, 12 pages.
Office action received for corresponding Chinese Patent Application No. 202080094417.2, dated Jul. 26, 2024, 14 pages of office action and 13 pages of summary and translation available.
Li et al., "Beam Management in Millimeter-Wave Communications for 5G and Beyond", IEEE Access, vol. 8, Jan. 1, 2020, pp. 13282-13293.
Office Action received for corresponding European Patent Application No. 20918289.8, dated Jul. 31, 2024, 6 pages.
Office action received for corresponding Vietnamese Patent Application No. 1-2022-04322, dated Aug. 30, 2024, 2 pages of office action and 2 pages of office action translation available.

* cited by examiner

BEAM REPORTING FOR RANK ENHANCEMENT

RELATED APPLICATION

This application was originally filed as PCT Application No. PCT/FI2020/050871, filed on Dec. 29, 2020, which claims priority from U.S. Provisional Application No. 62/975,933, filed on Feb. 13, 2020, each of which is incorporated herein by reference in its entirety.

FIELD

Some example embodiments may generally relate to mobile or wireless telecommunication systems, such as Long Term Evolution (LTE) or fifth generation (5G) radio access technology or new radio (NR) access technology, or other communications systems. For example, certain embodiments may relate to systems and/or methods of beam reporting for rank enhancement.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. 5G wireless systems refer to the next generation (NG) of radio systems and network architecture. A 5G system is mostly built on a 5G new radio (NR), but a 5G (or NG) network can also build on the E-UTRA radio. It is estimated that NR provides bitrates on the order of 10-20 Gbit/s or higher, and can support at least service categories such as enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. The next generation radio access network (NG-RAN) represents the RAN for 5G, which can provide both NR and LTE (and LTE-Advanced) radio accesses. It is noted that, in 5G, the nodes that can provide radio access functionality to a user equipment (i.e., similar to the Node B, NB, in UTRAN or the evolved NB, eNB, in LTE) may be named next-generation NB (gNB) when built on NR radio and may be named next-generation eNB (NG-eNB) when built on E-UTRA radio.

BRIEF DESCRIPTION OF THE DRAWINGS

For proper understanding of example embodiments, reference should be made to the accompanying drawings, wherein.

DETAILED DESCRIPTION

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for beam reporting for rank enhancement, is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments.

Additionally, if desired, the different functions or procedures discussed below may be performed in a different order and/or concurrently with each other. Furthermore, if desired, one or more of the described functions or procedures may be optional or may be combined. As such, the following description should be considered as illustrative of the principles and teachings of certain example embodiments, and not in limitation thereof.

Certain embodiments described herein may relate to 3GPP New Radio (NR) physical layer design for multiple input multiple output (MIMO) enhancements, for example in Release-17 and beyond. For example, to enable transmission rank improvement, some embodiments provide enhancements for beam reporting for scenarios with multiple transmission and reception points (TRPs) and/or multi-beam transmission and/or UEs equipped with multiple antenna panels.

NR 3GPP Release-15 is assumed to operate with beam based operation, both below and above 6 GHz carrier frequency range, where both the transmitter and receiver use spatial domain beamforming (e.g., in analog or digital domain) at transmission (TX) and/or reception (RX) to cover a propagation loss associated with a radio channel. Release-15 UEs can be equipped with multiple RX antenna panels associated with multiple antenna elements. Depending on UE reception capability, a set of UE antenna panels can be simultaneously used for reception.

Figure 1:
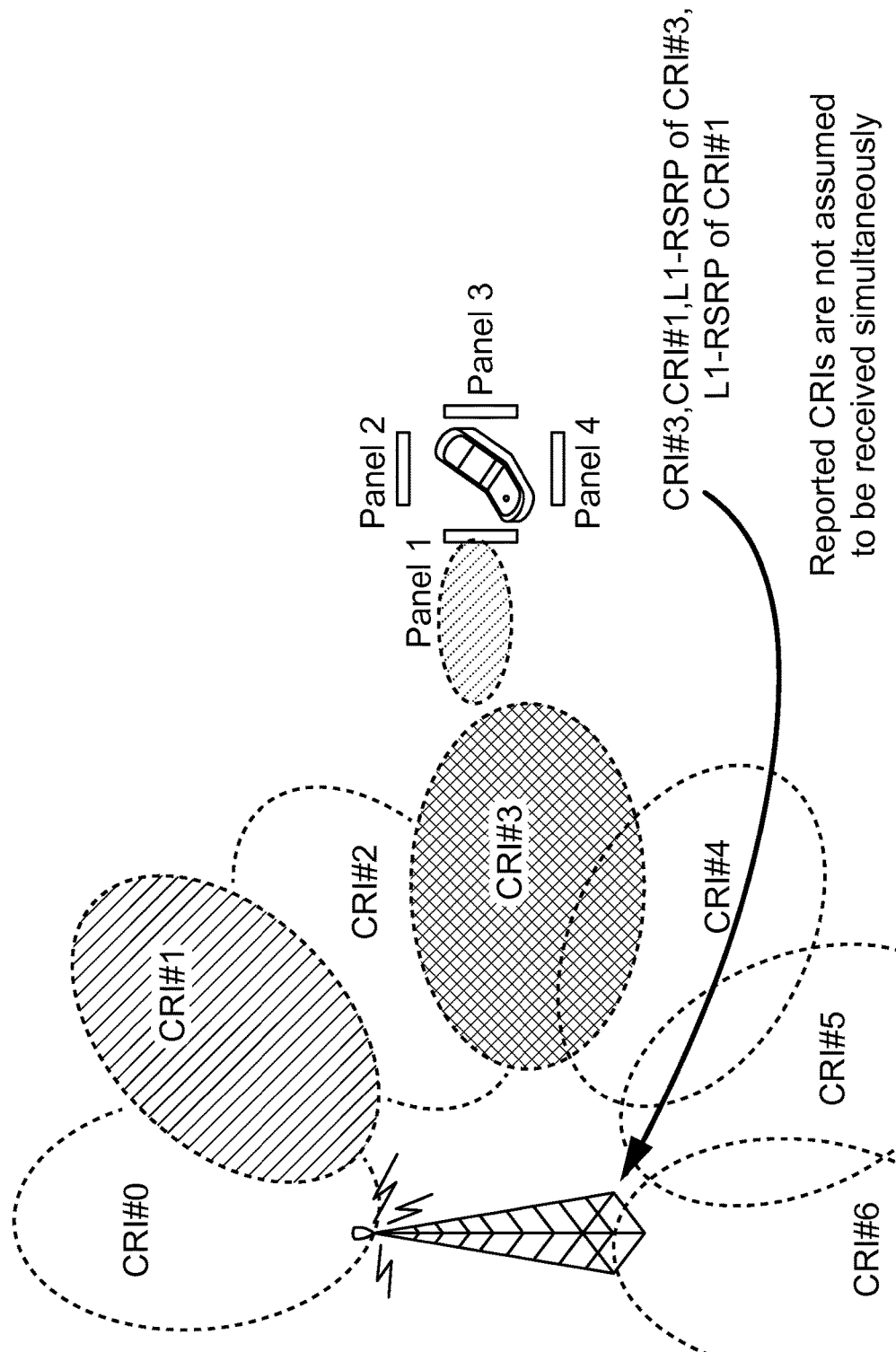
FIG. 1 illustrates an example of non-group beam reporting schemes.

To enable downlink (DL) channel state information (CSI) measurements for beam management (BM), NR Release-15 supports two different CSI resources settings, i.e., non-zero power (NZP)-CSI-reference signal (RS) and synchronization signal block (SSB). Time domain behavior of the NZP-CSI-RS resources for beam management can be configured by higher layer signalling to be aperiodic, periodic, or semi-persistent. The supported NZP-CSI-RS resource element (RE)-pattern and antenna port configurations for beam management are defined in 3GPP technical specification (TS) 38.214 and TS 38.331. Release-15 provides supports for both UE non-group and group-based beam reporting schemes. FIG. 1 illustrates a system showing an example of non-beam group-based reporting with NZP-CSI-RS resources. The network can configure up CSI-reporting with up to four CSI-RS resource indicators (CRIs) with layer 1 reference signal received power (L1-RSRP) values to be reported. In the example of FIG. 1, for simplicity, two CRIs (CRI #1, CRI #3) are shown when network configures beam reporting to be non-group-based reporting, the UE is not assumed to receive simultaneously reported CRIs associated with L1-RSRP values. When TX beam switch occurs among reported CRIs, some extra time may need to be reserved to enable the UE to change it RX beam and/or antenna panel accordingly. As a result of this, the scheduling flexibility of the network may be limited. To enable relaxation to the scheduling flexibility of the network, beam group-based reporting can be configured for the UE.

Figure 2:
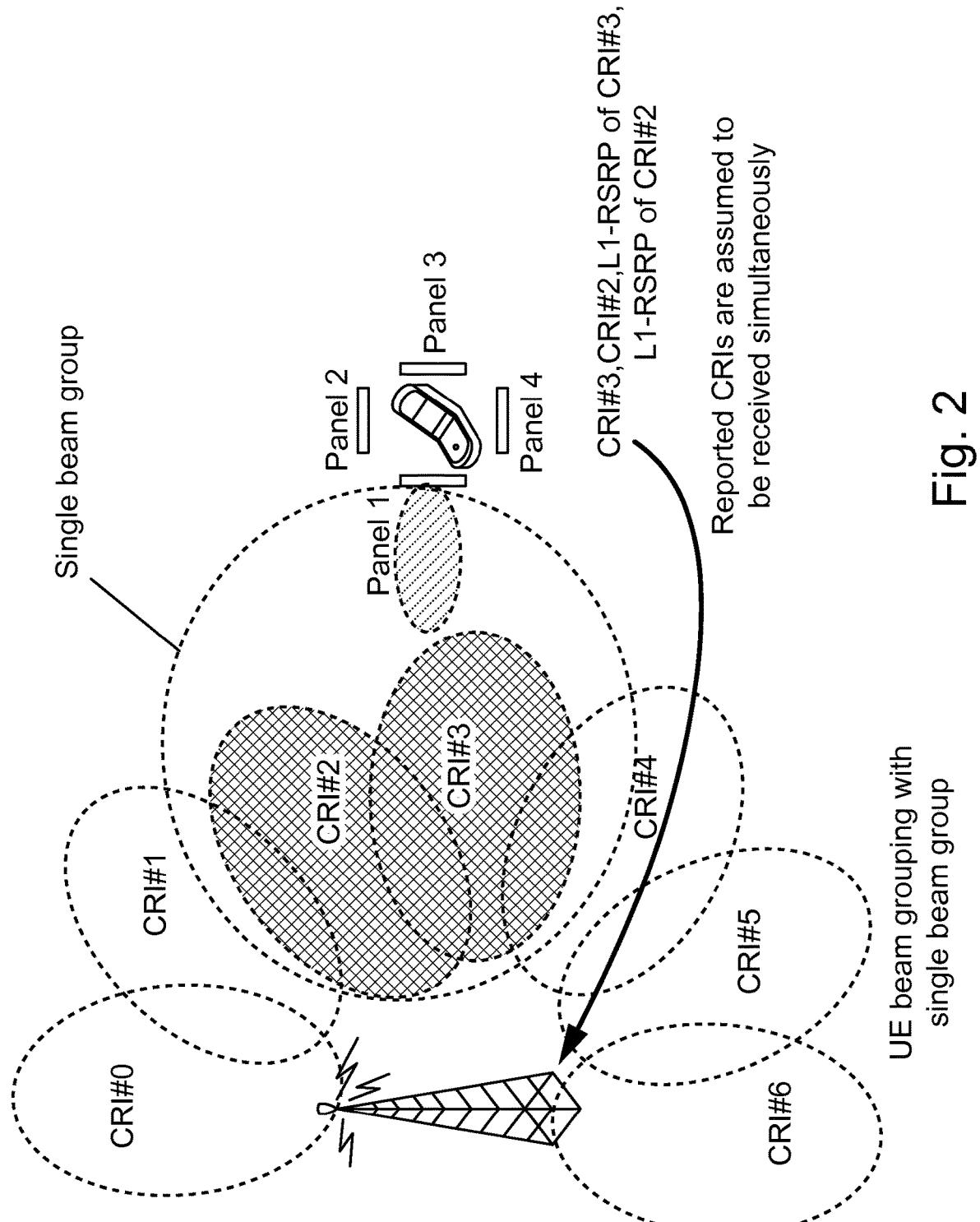
FIG. 2 illustrates an example of group-based beam reporting scheme with a single beam group.

FIG. 2 illustrates a system showing an example of beam group based reporting with NZP-CSI-RS resources with a single UE beam group. When a single beam group is configured, the UE may be assumed to receive simultaneously up to four CRIs. In the example of FIG. 2, for simplicity, only two CRIs (CRI #2, CRI #3) are shown. Since multiple CRIs can be received with a single UE beam group, no extra time needs to be reserved when TX beam switch occurs within the beam group. As a result of this, the scheduling restrictions of a network can be reduced.

With respect to CSI report setting for beam management, both non- and differential based reporting for both non-group and group-based beam reporting are supported in NR Release-15. It is noted that a reporting format may be reused among non- and group-based schemes. Differential reporting aims at reducing CSI reporting overhead by utilizing differential encoding. When the number of reported CRIs is larger than one, differential reporting may be used. It has been defined that 7 bit-length field is reserved to indicate quantized measured L1-RSRP between the largest and smallest L1-RSRP value (−140 dBm to −44 dBm). Additionally, 4 bit-length fields are reserved to indicate differentially coded L1-RSRP value with respect to the maximum value with 2-bit step-size. Furthermore, the network can configure up to 4 CRIs or SSB resource indicators associated with L1-RSRP values to be reported.

Quasi-co-location (QCL) rules are defined for use in Release-15/16 for the beam indication and different estimation purposes (e.g., channel and delay spread, time- and frequency offset) at the UE side. Table 1 illustrates the relationships between QCL source RSs and target signals and channels to be received in DL. As can be observed, CSI-RS for time and frequency tracking, i.e., periodic tracking reference signal (P-TRS), is the main QCL source RS for the reception of the target signals like CSI-RS for CSI acquisition, physical downlink control channel (PDCCH) and physical downlink shared channel (PDSCH) reception.

TABLE 1

| Target signal or channel to be received | QCL source RS |
|---|---|
| P-TRS | QCL-TypeC: SSB |
|  | QCL-TypeD: SSB |
|  | OR |
|  | QCL-TypeC: SSB |
|  | QCL-TypeD: CSI-RS with repetition (for P3) |
| A-TRS | QCL-TypeA: P-TRS |
|  | QCL-TypeD: P-TRS |
| CSI-RS without repetition (P2, CSI acquisition) | QCL-TypeA: P-TRS |
|  | QCL-TypeD: P-TRS |
|  | OR |
|  | QCL-TypeA: P-TRS |
|  | QCL-TypeD: SSB |
|  | OR |
|  | QCL-TypeA: P-TRS |
|  | QCL-TypeD: CSI-RS with repetition (for P3) |
|  | OR |
|  | QCL-TypeB: P-TRS |
| CSI-RS with repetition (P3) | QCL-TypeA: P-TRS |
|  | QCL-TypeD: P-TRS |
|  | OR |
|  | QCL-TypeA: P-TRS |
|  | QCL-TypeD: CSI-RS with repetition (P3) |
|  | OR |
|  | QCL-TypeC: SSB |
|  | QCL-TypeC: SSB |
| PDCCH DMRS and PDSCH DMRS | QCL-TypeA: P-TRS |
|  | QCL-TypeD: P-TRS |
|  | OR |
|  | QCL-TypeA: P-TRS |
|  | QCL-TypeD: CSI-RS with repetition (for P3) |
|  | OR |
|  | QCL-TypeA: CSI-RS without repetition (P2) |
|  | QCL-TypeD: CSI-RS without repetition (P2) |

It should be noted that certain beam management procedures may be supported within one or multiple transmission and reception points (TRPs). For example, procedure P1 may refer to a beam management procedure that can be used to enable UE measurement on different TRP Tx beams to support selection of TRP Tx beams/UE Rx beam(s). For beamforming at TRP, this may typically include an intra/inter-TRP Tx beam sweep from a set of different beams. For beamforming at UE, this may typically include a UE Rx beam sweep from a set of different beams. Additionally, procedure P2 may refer to a beam management procedure that can be used to enable UE measurement on different TRP Tx beams to possibly change inter/intra-TRP Tx beam(s). This may be from a possibly smaller set of beams for beam refinement than in P1. It is noted that that P2 can be a special case of P1. Another beam management procedure, procedure P3, may be used to enable UE measurement on the same TRP Tx beam to change UE Rx beam in the case UE uses beamforming.

Figure 3:
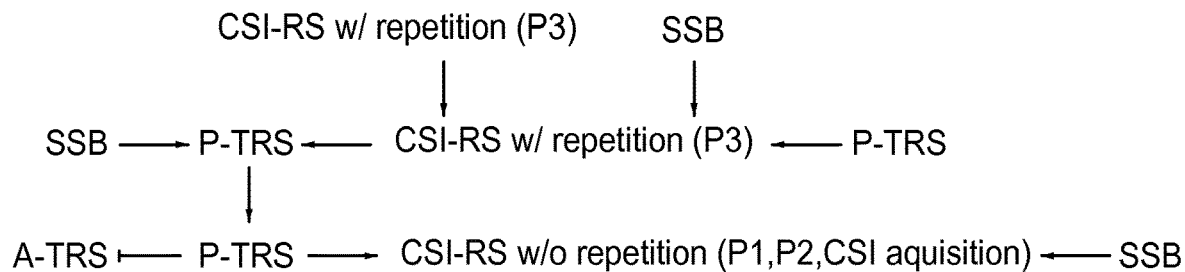
FIG. 3 illustrates an example of spatial relations (QCL-typeD) for CSI-RS and SSB resources.

FIG. 3 illustrates an example of spatial relationships (i.e., QCL-typeD) between SSB and NZP-CSI-RS resources for beam management purposes. In the example of FIG. 3, the starting point of the arrow defines a resource to be spatial source for the target resource associated at the end of the arrow. For example, NZP-CSI-RS based periodic time-frequency tracking reference signal (P-TRS) can work as a spatial source for aperiodic TRS (A-TRS) or another NZP-CSI-RS without repetition (e.g., for beam management (BM) procedures P1, P2 as well as CSI-acquisition) or NZP-CSI-RS with repetition (BM P3). Similarly, a SSB resource can be configured as spatial source for the target P-TRS or CSI-RS with and without repetition.

Figure 4:
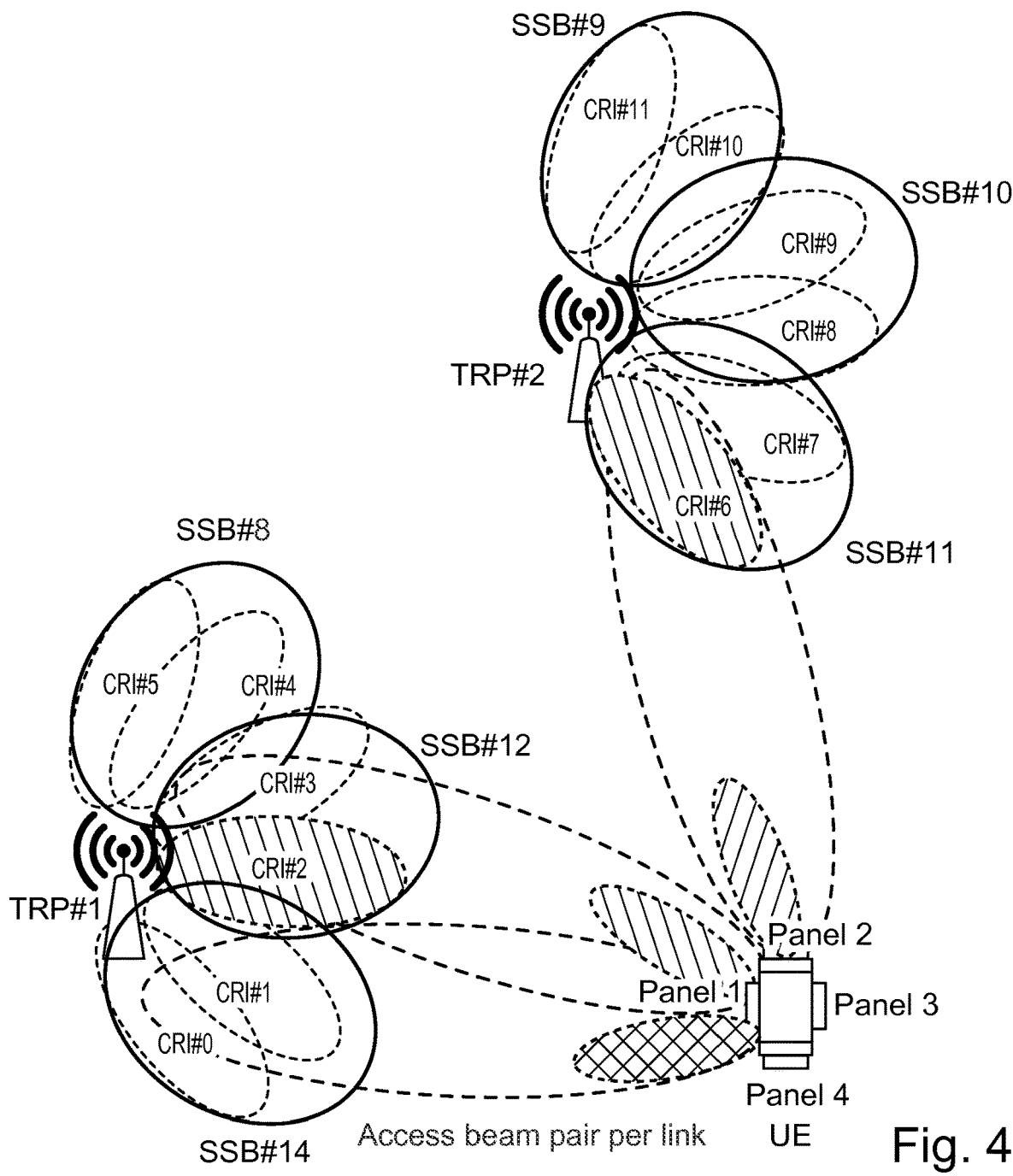
FIG. 4 illustrates an example of TX and RX beam identification procedure, according to an embodiment.

FIG. 4 illustrates an example of Release-15 TX and RX beam identification procedure for multi-TRP deployment, where UEs are equipped with multiple antenna panels. As illustrated in the example of FIG. 4, in order to enable basic beam-based operation (e.g., control and data information delivery, coarse/fine time frequency tracking), a network may configure the UE to measure SSB resources from two TRPs, i.e. TRP #1 and TRP #2, and report related L1-RSRP values and SSB indices. In the reporting configuration, the network has configured the UE to report the N best, e.g. N=2, SSB resources and corresponding L1-RSRP values. In the example of FIG. 4, based on a reporting configuration, the UE reports two strongest SSB indices, i.e., #12 and #14, and their corresponding L1-RSRP values to a serving TRP. However, in this example, the UE does not report SSB #1 because related L1-RSRP value is smaller with respect to SSB #12 and #14. After TX and RX beams for a basic beam-based operation have been identified, the network can configure NZP-CSI-RS resources associated with TX beams with narrower beam widths in spatial domain, i.e., sub-beams of SSB beams, for further TX and RX beam refinement. To ease identification of further refined TX and RX beams, prior identified resources are used as Quasi-Co-Location sources in a spatial domain for NZP-CSI-RS resources. As a result, the network and UEs are able to identify new TX beams without exhaustive computational complexity, major reference signal overhead and with reduced latency. In this example, UE identifies NZP-CSI-RS resource indices, i.e., CRI #2 and #3 by using SSB #12 and CRI #0 and #1 by using SSB #14 as a spatial source. However, it is likely that the rank of effective channel (i.e., capturing effect of TX beam(s)+radio channel+RX beam(s)) associated with SSB TX beams is higher compared with the rank of effective channel associated with sub-beams of SSBs. This is due to fact that TX and/or RX beams having narrower beam widths can capture reduced amount of independent spatial clusters/scatters under each TX-RX beam pair per link with respect to TX and RX beams having wider beam width. Therefore, it may not be beneficial to use TX sub-beams of SSBs for rank enhancements. It is also noted that a single UE antenna panel is only able to direct RX beam into a one spatial direction (combination of azimuth and elevation) at a time, leading also to restrictions to enhance the transmission rank in single or multi-TRP deployment scenario with multi-beam transmission.

Figure 5:
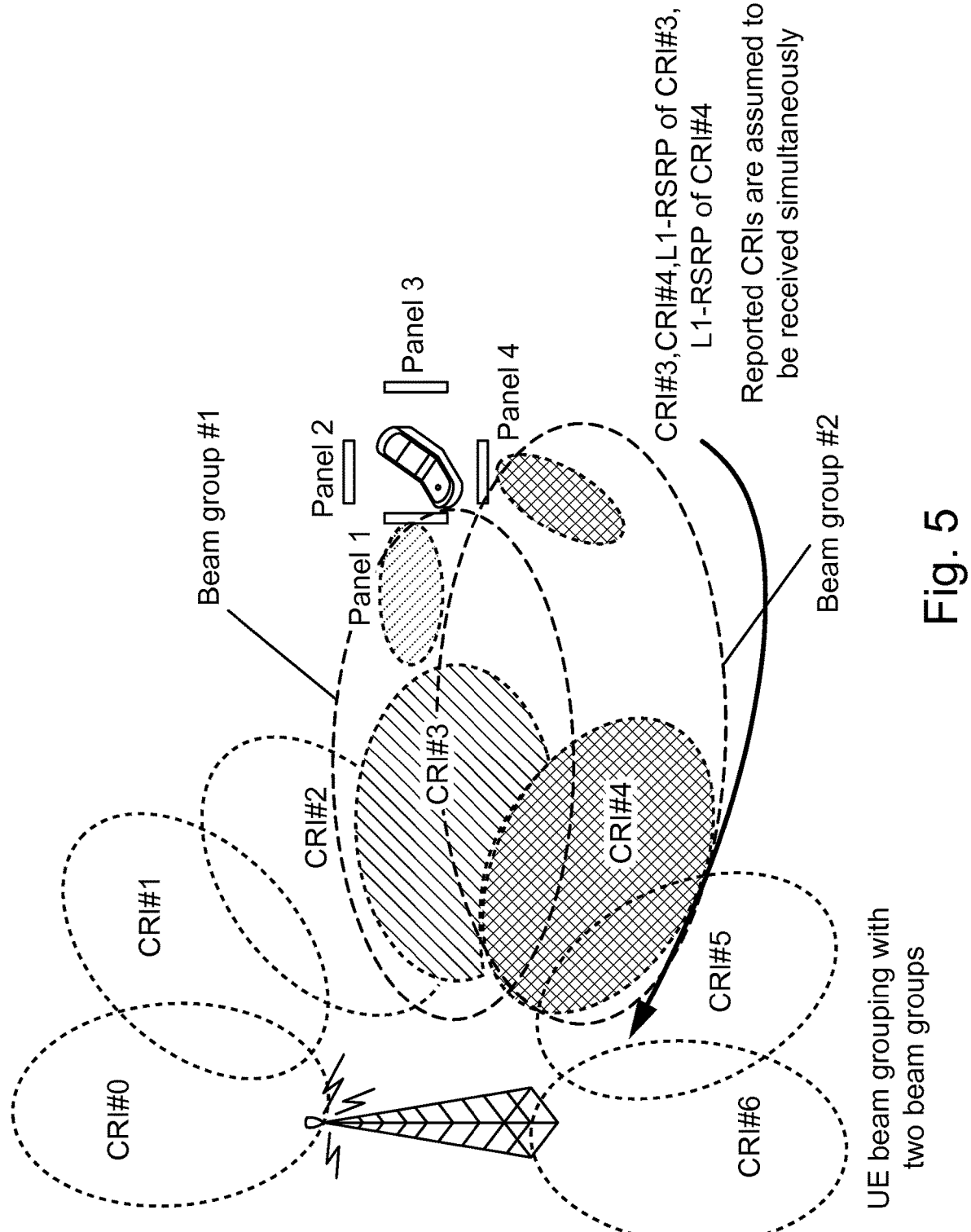
FIG. 5 illustrates an example of group-based beam reporting scheme with two beam groups, according to an embodiment.

NR Release-15/Release-16 specifications provide transparent support for the number of UE antenna panels used for simultaneous DL reception. In other words, when a UE provides a beam report for the network, the network does not have an understanding of how many UE RX antenna panels are simultaneously used for TX and RX beam identification. Release-15/Release-16 specifications also provide support for a group based reporting, as illustrated in the example of FIG. 5. When group based reporting is configured, as illustrated in the example of FIG. 5, the UE may report in single reporting instance two different CRIs or SSB resource indices for each reporting setting where NZP-CSI-RS and/or SSB resources can be received simultaneously by the UE either with a single or multiple spatial domain receive filters. Due to the transparency of UE antenna panels as well as lack of awareness related to a simultaneous reception capability of the UE, the network does not have understanding whether reported resources can be used for the transmission rank increase or not. In other words, the supported beam reporting procedures and signalling mechanisms do not provide any support for even a rough level of potential transmission rank. To obtain transmission rank information, the network needs to configure separate NZP-CSI-RS resource transmission for CSI acquisition based on the reported resources. Due to this CSI acquisition state, extra latency needs to be introduced into the system.

In view of the foregoing discussion, there is a strong need to develop enhanced UE beam reporting procedures and signalling mechanisms that enable to determine achievable transmission rank, with reduced latency and signalling overhead, e.g., for NR Release-17. The need for this may become even more important for very high carrier frequencies (e.g., above 52.6 GHz) where a system is assumed to operate even more narrow TX and RX beams in spatial domain resulting in potentially high reference signal overhead.

Certain embodiments provide an enhanced beam reporting criteria and/or rule-set for beam reporting that facilitates transmission rank enhancement with reduced latency and signalling overhead in a single and/or multi-TRP scenario. More specifically, in one embodiment, an enhanced beam reporting criteria and/or rule-set for UE beam reporting is defined, for instance, to enable transmission rank enhancement with reduced latency and signaling overhead in single and/or multi-TRP scenario with multi-beam transmission. According to some embodiments, the enhanced beam reporting criteria and/or rule set may include any combination of the following conditions: spatial domain difference, simultaneous reception, power difference, and/or control resource set (CORESET) pool. For the spatial domain difference condition, a UE may be configured to report up to K-best, in terms of L1-RSRP and/or L1-signal-to-noise-and-interference-ratio (SINR), values of measured CSI resources (i.e. NZP-CSI-RS and/or SSB) that resources associated with channel measurements do not share the same ending point or crossing point reference resource(s) between the spatial QCL-chains of measured CSI resources. In one example, a UE may be configured to assume that this is a default operation mode for enhanced beam reporting. According to an embodiment, depending on the configured spatial QCL-chain for the measured CSI resource, the QCL-chain may include multiple stages of spatial source for the measured CSI resource. For example for NZP-CSI-RS resource (without repetition P1/P2) can have three different spatial QCL-offsets such as: SSB (ending point)→*P-TRS→P-TRS→NZP-CSI-RS (measured resource, i.e., starting point). In an alternative or additional embodiment, the network may also configure separately the spatial-QCL-offset from the measured CSI resource. The spatial-QCL-offset defines the virtual ending point of the spatial QCL-chain computed from the measured resources to determine spatial difference of reference resource for the determination of beam reporting.

In one alternative or additional embodiment, QCL chain can be defined as reference signals having same QCL type or combinations of them (e.g QCL-TypeA and/or QCL-TypeB and/or QCL-TypeC and/or QCL-TypeD and/or QCL-TypeE). QCL chain can be associated with measured CSI resource or another reference CSI resource. Different QCL types are defined as follows:

'QCL-TypeA': {Doppler shift, Doppler spread, average delay, delay spread}
'QCL-TypeB': {Doppler shift, Doppler spread}

'QCL-TypeC': {Doppler shift, average delay}
'QCL-TypeD': {Spatial Rx parameter}
'QCL-TypeE': {Interference}

For the simultaneous reception condition, when simultaneous reception is configured for a beam reporting, a UE may be configured to report up to K-best in terms of L1-RSRP and/or L1-signal-to-noise-and-interference-ratio (SINR) values of different measured CSI resources for spatial multiplexing that can be simultaneously received by using multiple different RX antenna ports and/or UE antenna panels and/or spatial filters.

The power difference may define the maximum allowed power difference between the maximum and minimum of measured signal quality values, e.g., L1-RSRP or L1-RSRP, for CSI resources to be reported conditioned under same QCL-source (end or crossing) or conditioned to not to be under same QCL-source (end or crossing). In an embodiment, when power difference is configured, the UE may report up to K best, in terms of L1-RSRP and/or L1-signal-to-noise-and-interference-ratio (SINR), values of the measured CSI resources that are within the window between maximum and minimum values of reported signal quality, e.g., L1-RSRP or L1-SINR, is less or equal to configured threshold for the spatial power difference. For example, if a network has configured power difference window to be 10 db, the following L1-RSRP values −110 db and −115 db are reported out of −110 db, −115 db, 125 db (e.g., where K represents any integer value). The network may configure power difference by RRC and/or MAC and/or physical layer signaling. In alternative embodiment, the network may configure a specific reception threshold that defines a UE to report up K-best measured signal quality values of CSI resources being above or equal to the power threshold. The network may configure the threshold by RRC and/or MAC and/or physical layer signaling. In some embodiments, the difference of signal quality values within power window or signal quality values being above the reception threshold may also be expressed using the differential encoding with respect to the maximum signal quality value.

For the resource set pool or CORESET-pool condition, a UE may be configured to report up to K-best, in terms of L1-RSRP and/or L1-signal-to-noise-and-interference-ratio (SINR), values of measured CSI resources (i.e., NZP-CSI-RS and/or SSB) that resources associated for channel measurements do not share the same ending point or crossing point reference resource among the spatial QCL-chains and the ending point reference resources of QCL-chains should be associated with preconfigured TCI states of different resource sets (e.g., CORESETs) having different resource set parameter (e.g., CORESET Pool Index) values.

In some embodiments, any combination of the above-discussed criteria or conditions (except simultaneous reception) for enhanced beam reporting can be configured as UE RX antenna port and/or antenna panel specifically.

In an alternative or additional embodiment, when enhanced beam reporting is configured antenna panel specifically, UE RX antenna panel/port ID used for simultaneous reception may be reported explicitly or implicitly as a part of enhanced beam report. When explicitly indicated, UE antenna panel IDs may be added into the enhanced beam report. When implicitly indicated, the network has preconfigured the UE to be aware of how antenna panel specific reported CSI resources and related L1-RSRP/L1-SINR value are associated with the enhanced beam report without explicit antenna panel IDs.

In one embodiment, both default and fallback UE reporting procedures for enhanced beam reporting may be defined.

According to some embodiments, the default UE reporting procedure may include, when a UE determines enhanced beam reporting based on configured CSI resources and any of the above criteria/conditions are fulfilled, the UE may be configured to report the determined resources and their corresponding signal quality values by using existing CSI reporting format for the beam reporting. This indicates implicitly for a network that transmission rank K may be achievable with multi-beam and/or multi-TRP transmission.

According to certain embodiments, the fallback UE reporting procedure may include, when a UE determines enhanced beam reporting based on configured CSI resources and any of the above criteria/conditions is/are not fulfilled, the UE may be configured to report up to K times the same resource index. This can be done by repurposing existing CSI reporting format for the beam reporting. This indicates implicitly for a network that UE rank enhancement is not achievable. In one example, a UE may be configured to repeat highest L1-RSRP NZP-CSI-RS resource index (CRI) or SSB index. This can be similarly expanded to any K. For example, in case K=4 and UE can obtain only, e.g., max_rank=2 it may repeat first NZP-CSI-RS/SSB resource index two times, second NZP-CSI-RS two times in the report, that provide the rank similarly in case max_rank=3, UE may list the different CSI-RS indices first and repeat, e.g., the last (or any index) so that up to K=4 is reported. This informs the network implicitly of the obtainable rank.

Figure 6:
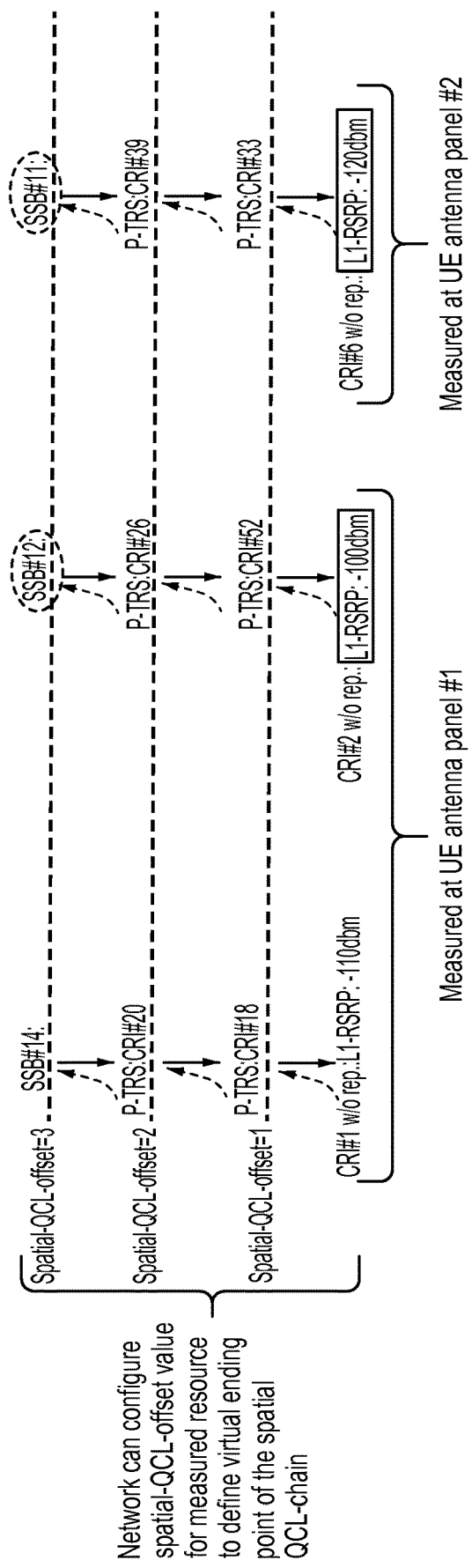
FIG. 6 illustrates an example of enhanced beam reporting configured with different spatial-QCL offset values in spatial QCL-chains, according to an embodiment.

FIG. 6 illustrates an example of different spatial-QCL-offset values configured by a network for enhanced beam reporting, according to one example embodiment. In the example of FIG. 6, the network has configured a UE to perform L1-RSRP measurements and reporting based on configured NZP-CSI-RS resources (i.e., CRI #0-5 and CRI #6-11) associated with two different TRPs, as shown in FIG. 4. The network has configured the UE to report two best DL NZP-CSI-RS resources according to the enhanced beam reporting rule-set provided by example embodiments. For example, the network has configured by RRC and/or MAC and/or physical layer signalling spatial domain difference condition with spatial-QCL-offset equal to 3 (it can be also 1 or 2) simultaneous reception to ON in enhanced beam reporting configuration. Based on the beam reporting configuration, the UE may determine the beam report where CRI #2 and CRI #6 are reported with related L1-RSRP values. The reason for this is that UE SSB #12 and SSB #11 are different spatial sources and are not shared spatial sources for CRI #2 and CRI #6. Furthermore, the UE cannot simultaneously receive CRI #1 and CRI #2 for spatially multiplexing of them (i.e., resources received by same UE antenna panel).

Figure 7:
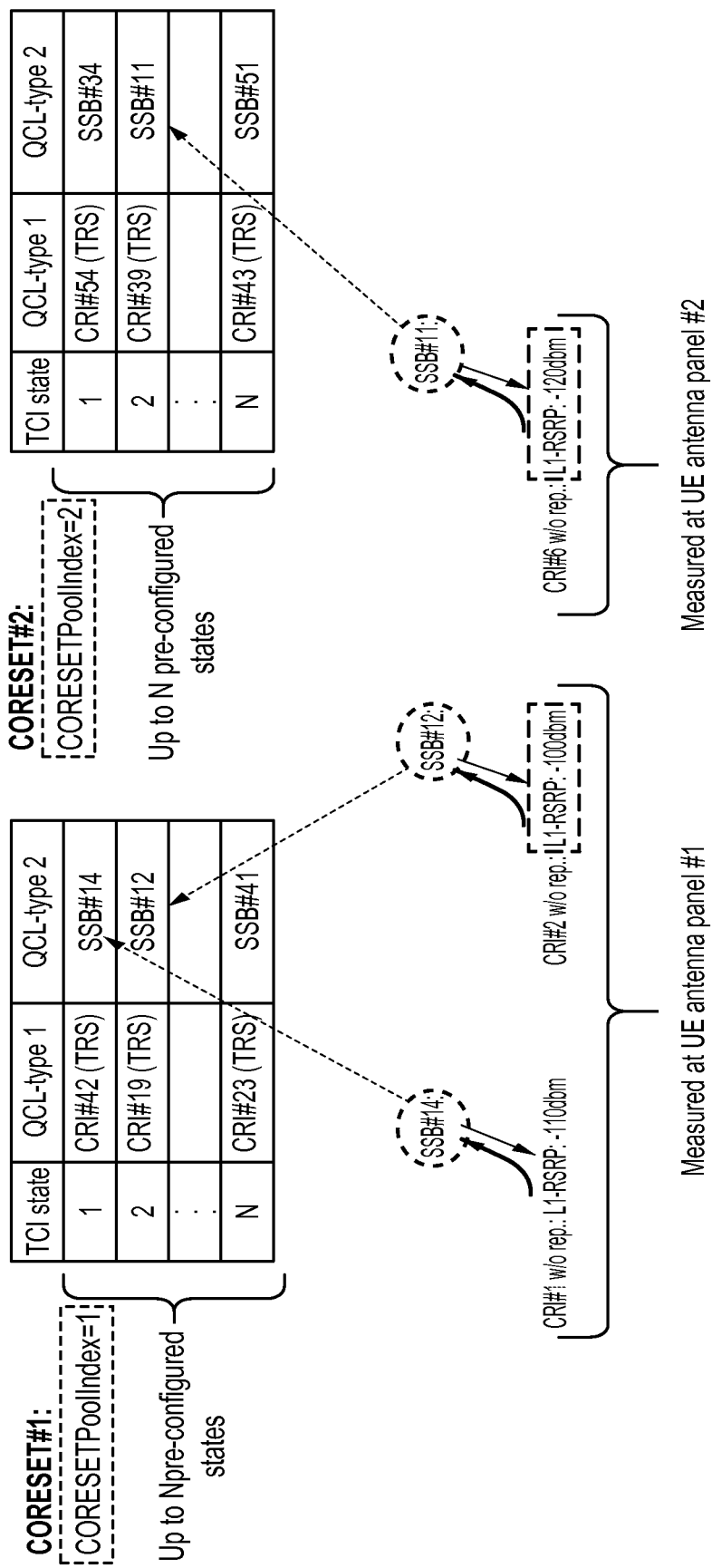
FIG. 7 illustrates an example of spatial relation based beam reporting ruleset, according to an example embodiment.

FIG. 7 illustrates an example of the usage of the enhanced beam reporting rule set, according to some embodiments. In the example of FIG. 7, the network has configured a UE to perform L1-RSRP measurements and reporting based on configured NZP-CSI-RS resources (i.e., CRI #0-5 and CRI #6-11) associated with two different TRPs as shown in FIG. 4. Further, in this example, the network has preconfigured the UE with two different CORESETs with N TCI states, i.e., CORESET #1 and CORESET #2. Then, these two CORESETs may be configured with two different CORESETPoolIndex values. According to Release-16 specification, a UE may expect the reception of full or partially-overlapped PDSCHs in time only when PDCCHs that schedule two PDSCHs are associated to different CORESETs having different values of CORESET Pool Index. In other words, the transmissions of PDSCH and PDCCH may be associated with different CORESETs that may be associated with different TRPs.

In the example of FIG. 7, the network has configured UE to report two best DL NZP-CSI-RS resources according to the proposed beam reporting rule-set. Also in the example of FIG. 7, the network has configured by RRC and/or MAC and/or physical layer signalling CORESET Pool condition, power difference to be 20 dB and simultaneous reception to ON in enhanced beam reporting configuration. The CORESET Pool defines that UE shall report up to K-best measured CSI resources (i.e., NZP-CSI-RS and/or SSB) that do not share same ending or crossing point CSI resource in the spatial QCL-chain and the ending point resources of QCL-chains should be associated with preconfigured TCI states of different CORESET having different CORESET Pool Index values. The power difference defines that the maximum allowed power difference between maximum and minimum value among K-best reported resources in terms of L1-RSRP or L1-SINR. The simultaneous reception configures the UE to report CSI resources that can be simultaneously received at the UE-side (by using different RX antenna ports and/or antenna panels).

As further illustrated in the example of FIG. 7, based on the resource and reporting configuration, the UE has made three different L1-RSRP measurements based on configured NZP-CSI-RS resources, i.e. CRI #1, CRI #2 and CRI #6, associated with L1-RSRP values, −110 dbm, −100 dbm and −120 dbm, respectively. By using the enhanced beam reporting configuration, the UE can determine that spatial sources of CRI #1 and CRI #2 being SSB #14 and SSB #12 are associated with the same CORESET and CORESET Pool Index. However, the spatial source of CRI #6 is SSB #11 that is associated with different CORESET having different CORESET Pool Index. Therefore, due to the configured CORESET Pool condition, even though CRI #1 and CRI #2 are associated with a larger L1-RSRP value compared with CRI #6, the UE selects CRI #2 and CR #6 to be reported. Since the provided beam reporting ruleset imposes a UE to identify CSI resources associated with different spatial sources, the likelihood for transmission rank aggregation over multiple CSI resources associated with multiple TRPs increases. As a result, the latency and signalling overhead related to transmission and reporting of CSI resources reduces.

Figure 8A:
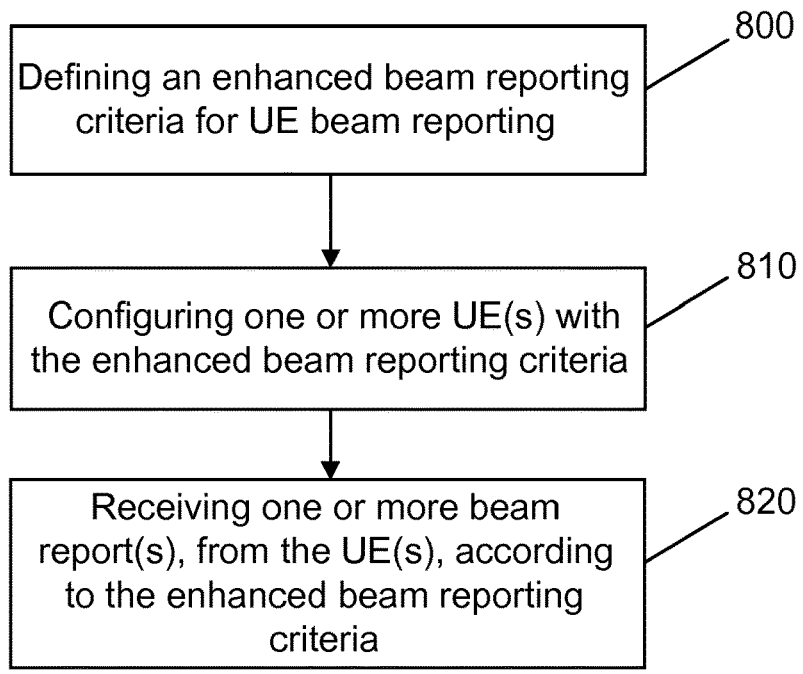
FIG. 8a illustrates an example flow diagram of a method for beam management reporting, according to one example embodiment.

FIG. 8a illustrates an example flow diagram of a method for beam reporting, according to one embodiment. In an example embodiment, the flow diagram of FIG. 8a may be performed by a network entity or network node associated with a communication system, such as LTE or 5G NR. For instance, in some example embodiments, the network node performing the method of FIG. 8a may include a base station, eNB, gNB, NG-RAN node, and/or TRP.

As illustrated in the example of FIG. 8a, the method may include, at 800, defining or determining an enhanced beam reporting criteria and/or rule-set for UE beam reporting. For instance, the enhanced beam reporting criteria and/or rule-set may enable transmission rank enhancement with reduced latency and signaling overhead in single and/or multi-TRP scenarios with multi-beam transmission. According to some embodiments, the enhanced beam reporting criteria and/or rule set may comprise one or more of the following conditions: spatial domain difference, simultaneous reception, power difference, and/or resource set pool (e.g., CORESET pool).

In an embodiment, the method may include, at 810, configuring one or more UE(s) with the enhanced beam reporting criteria and/or rule-set. For example, the configuring 810 may include configuring the UE(s) with one or more of the spatial domain difference condition, simultaneous reception condition, power difference condition, and/or resource set pool (e.g., CORESET pool) condition.

When configuring the UE(s) for the spatial domain difference condition, the configuring 810 may include configuring the UE(s) to report up to K-best, in terms of L1-RSRP and/or L1-signal-to-noise-and-interference-ratio (SINR), values of measured CSI resources that resources associated with channel measurements do not share the same ending point or crossing point reference resource(s) among the spatial QCL-chains of measured CSI resources. In an embodiment, the measured CSI resources may include NZP-CSI-RS and/or SSB. According to one example, the configuring 810 may include configuring the UE(s) to assume that the spatial domain difference condition is a default operation mode for enhanced beam reporting. According to an embodiment, depending on the configured spatial QCL-chain for the measured CSI resource, the QCL-chain may include multiple offsets of spatial source for the measured CSI resource. In an alternative or additional embodiment, the configuring 810 may include configuring the spatial-QCL-offset separately from the measured CSI resource. The spatial-QCL-offset defines the virtual ending point of the spatial QCL-chain computed from the measured resource to determine spatial difference of reference resource for the determination of beam reporting.

When configuring the simultaneous reception condition for beam reporting, the configuring 810 may include configuring the UE(s) to report up to K-best, in terms of L1-RSRP and/or L1-signal-to-noise-and-interference-ratio (SINR), values of different measured CSI resources for spatial multiplexing that can be simultaneously received by using multiple different RX antenna ports and/or UE antenna panels and/or spatial filters.

In an embodiment, when configuring the power difference condition, the configuring 810 may include configuring the UE(s) to report up to K-best the measured CSI resources that are within the window between maximum and minimum values of reported signal quality, e.g., L1-RSRP or L1-SINR, is less or equal to configured threshold for the spatial power difference. Thus, the power difference condition may define the maximum allowed power difference between the maximum and minimum of measured signal quality values, e.g., L1-RSRP or L1-RSRP, for CSI resources to be reported conditioned under same QCL-source (end or crossing) or conditioned to not to be under same QCL-source (end or crossing). The configuring of the power difference condition may be performed by RRC and/or MAC and/or physical layer signaling. In alternative embodiment, the configuring of the power difference condition may include configuring a specific reception threshold that defines the UE(s) to report up K-best measured signal quality values being above or equal to the power threshold. The Network may configure the threshold by RRC and/or MAC and/or physical layer signaling. In some embodiments, the difference of signal quality values within power window or signal quality values being above the reception threshold may also be expressed using the differential encoding with respect to the maximum signal quality value.

When configuring the resource set pool (or CORESET-pool) condition, the configuring 810 may include configuring the UE(s) to report up to K-best measured CSI resources that do not share the same ending point or crossing point reference resource among the spatial QCL-chains and the ending point reference resources of QCL-chains should be associated with preconfigured TCI states of different resource sets (e.g., CORESETs) having different resource set parameter (e.g., CORESET Pool Index) values.

In some embodiments, the configuring 810 may include configuring any combination of the above-discussed criteria or conditions (except simultaneous reception) for enhanced beam reporting as UE RX antenna port and/or antenna panel specifically.

In one embodiment, the defining 800 may include defining both default and fallback UE reporting procedures for enhanced beam reporting and, in this embodiment, the configuring 810 may include configuring the UE(s) with the default and fallback reporting procedures. According to some embodiments, the default UE reporting procedure may include, when a UE determines enhanced beam reporting based on configured CSI resources and any of the above criteria/conditions are fulfilled, configuring the UE(s) to report the determined resources and their corresponding signal quality values by using existing CSI reporting format for the beam reporting. This indicates implicitly for a network that rank K may be achievable with multi-beam and/or multi-TRP transmission with multi-beam transmission. According to certain embodiments, the fallback UE reporting procedure may include, when a UE determines enhanced beam reporting based on configured CSI resources and any of the above criteria/conditions is/are not fulfilled, configuring the UE to report up to K times the same resource index. This indicates implicitly to the network that UE rank enhancement is not achievable. In one example, the configuring may include configuring the UE(s) to repeat highest L1-RSRP NZP-CSI-RS resource index (CRI) or SSB index. For example, if K=4 and the UE can obtain, for example only max_rank=2, the UE may be configured to repeat first NZP-CSI-RS/SSB resource index two times and second NZP-CSI-RS two times in the report, that provide the rank similarly in case max_rank=3, UE may list the different CSI-RS indices first and repeat, e.g., the last or any index so that up to K=4 is reported. This informs the network implicitly of the obtainable rank, and can be similarly expanded to any number K.

In certain embodiments, the method of FIG. 8a may further include, at 820, receiving one or more beam report(s), from the UE(s), according to the enhanced beam reporting criteria and/or rule-set configured to the UE(s).

Figure 8B:
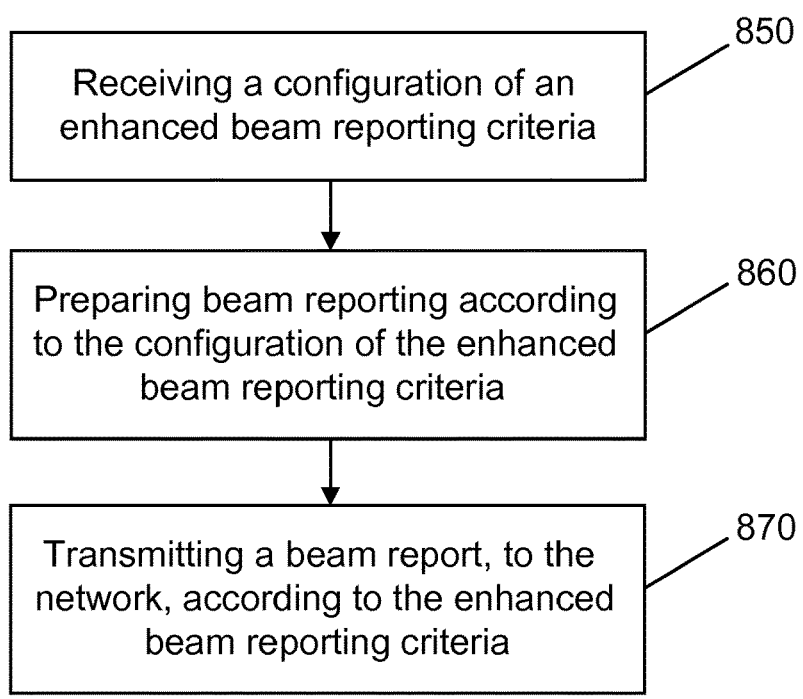
FIG. 8b illustrates an example flow diagram of a method for beam management reporting, according to one example embodiment.

FIG. 8b illustrates an example flow diagram of a method for beam reporting, according to one example embodiment. In certain example embodiments, the flow diagram of FIG. 8b may be performed by a network entity or network node associated with a communications system, such as LTE or 5G NR. For instance, in some example embodiments, the network entity performing the method of FIG. 8b may include a UE, mobile station, mobile device, IoT device, or the like.

In an embodiment, the method of FIG. 8b may include, at 850, receiving or determining a configuration of an enhanced beam reporting criteria and/or rule-set for UE beam reporting. According to an example, the enhanced beam reporting criteria and/or rule-set may enable or be used for transmission rank enhancement with reduced latency and signaling overhead in single and/or multi-TRP scenarios. In some embodiments, the enhanced beam reporting criteria and/or rule set configuration may comprise one or more of the following conditions: spatial domain difference, simultaneous reception, power difference, and/or resource set pool (e.g., CORESET pool).

According to one embodiment, the method of FIG. 8b may include, at 860, preparing beam reporting according to the configuration of the enhanced beam reporting criteria and/or rule-set.

In an embodiment, when the spatial domain difference condition is configured for the enhanced beam reporting, the determining 860 may include determining to report up to K-best in terms of L1-RSRP and/or L1-signal-to-noise-and-interference-ratio (SINR) values of measured CSI resources that resources associated with channel measurements do not share the same ending point or crossing point reference resource(s) among the spatial QCL-chains of measured CSI resources. In an embodiment, the measured CSI resources may include NZP-CSI-RS and/or SSB.

According to one example, the spatial domain difference condition may be configured as a default operation mode for enhanced beam reporting. According to an embodiment, depending on the configured spatial QCL-chain for the measured CSI resource, the QCL-chain may include multiple offsets of spatial source for the measured CSI resource. In an alternative or additional embodiment, the spatial-QCL-offset may be configured separately from the measured CSI resource. The spatial-QCL-offset defines the virtual ending point of the spatial QCL-chain computed from the measured resources to determine spatial difference of reference resource for the determination of beam reporting.

In one embodiment, when the simultaneous reception condition for beam reporting is configured, the determining 860 may include determining to report up to K different measured CSI resources for spatial multiplexing that can be simultaneously received by using multiple different RX antenna ports and/or UE antenna panels and/or spatial filters. In an embodiment, when the power difference condition is configured for the enhanced beam reporting, the determining 860 may include determining to report up to K-best in terms of L1-RSRP and/or L1-signal-to-noise-and-interference-ratio (SINR) values of the measured CSI resources that are within the window between maximum and minimum values of reported signal quality, e.g., L1-RSRP or L1-SINR, is less or equal to configured threshold for the spatial power difference. Thus, the power difference condition may define the maximum allowed power difference between the maximum and minimum of measured signal quality values, e.g., L1-RSRP or L1-RSRP, for CSI resources to be reported conditioned under same QCL-source (end or crossing) or conditioned to not to be under same QCL-source (end or crossing). In an embodiment, the receiving 850 of the configuration of the power difference condition may be performed by RRC and/or MAC and/or physical layer signaling. In alternative embodiment, the receiving 850 of the configuration of the power difference condition may include receiving a configuration for a specific reception threshold for reporting up K-best measured signal quality values being above or equal to the power threshold. In an embodiment, the receiving 850 may include receiving the configuration for the threshold by RRC and/or MAC and/or physical layer signaling. In some embodiments, the difference of signal quality values within power window or signal quality values being above the reception threshold may also be expressed using the differential encoding with respect to the maximum signal quality value.

According to an embodiment, when the resource set pool (or CORESET-pool) condition is configured for the enhanced beam reporting, the determining 860 may include determining to report up to K-best in terms of L1-RSRP and/or L1-signal-to-noise-and-interference-ratio (SINR) values of measured CSI resources that resources associated with channel measurements do not share the same ending point or crossing point reference resource among the spatial QCL-chains and the ending point reference resources of QCL-chains should be associated with preconfigured TCI states of different resource sets (e.g., CORESETs) having different resource set parameter (e.g., CORESET Pool Index) values. In some embodiments, the receiving 850 of the configuration may include receiving any combination of the above-discussed criteria or conditions (except simultaneous reception) for enhanced beam reporting as UE RX antenna port and/or antenna panel specifically.

In one embodiment, the receiving 850 of the configuration may include both default and fallback UE reporting procedures for enhanced beam reporting. According to some embodiments, the default UE reporting procedure may include, when it is determined that enhanced beam reporting based on configured CSI resources and any of the above criteria/conditions are fulfilled, the determining 860 may include determining to report the determined resources and their corresponding signal quality values by using existing CSI reporting format for the beam reporting. This indicates implicitly for a network that rank K may be achievable with multi-beam and/or multi-TRP transmission.

According to certain embodiments, the fallback UE reporting procedure may include, when it is determined that enhanced beam reporting based on configured CSI resources and any of the above criteria/conditions is/are not fulfilled, the determining 860 may include determining to report up to K times the same resource index. This indicates implicitly to the network that UE rank enhancement is not achievable. In one example, the determining 860 may include determining to repeat highest L1-RSRP NZP-CSI-RS resource index (CRI) or SSB index. For example, if K=4 and, for example only max_rank=2 can be obtained, the determining 860 may include determining to repeat first NZP-CSI-RS/SSB resource index two times and second NZP-CSI-RS two times in the report, that provide the rank similarly in case max_rank=3, and listing the different CSI-RS indices first and repeating, e.g., the last or any index so that up to K=4 is reported. This informs the network implicitly of the obtainable rank, and can be similarly expanded to any number K.

In one embodiment, the method of FIG. 8b may also include, at 870, providing or transmitting a beam report, to the network, according to the enhanced beam reporting criteria.

Figure 9A:
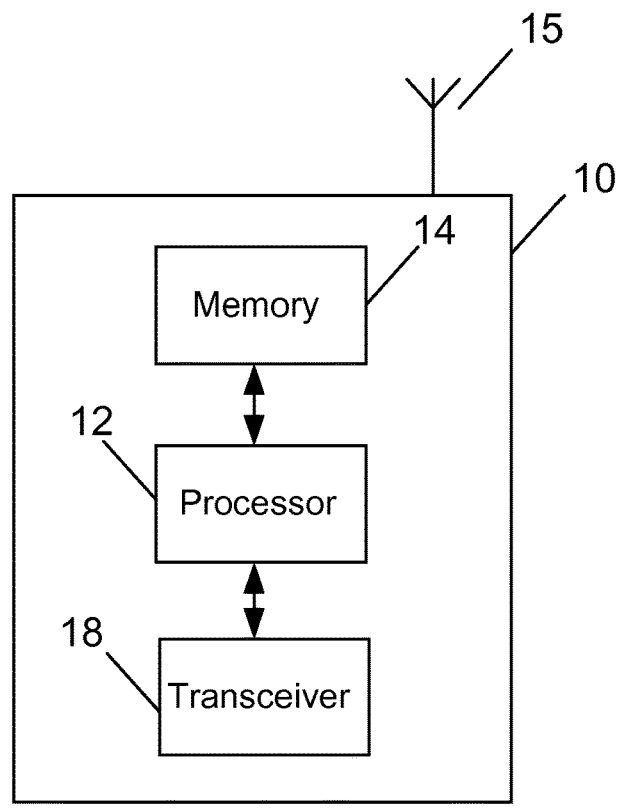
FIG. 9a illustrates an example block diagram of an apparatus, according to an embodiment.

FIG. 9a illustrates an example of an apparatus 10 according to an embodiment. In an embodiment, apparatus 10 may be a node, host, or server in a communications network or serving such a network. For example, apparatus 10 may be a satellite, base station, a Node B, an evolved Node B (eNB), 5G Node B or access point, next generation Node B (NG-NB or gNB), and/or WLAN access point, associated with a radio access network, such as a LTE network, 5G or NR. In example embodiments, apparatus 10 may be or may include a NG-RAN node, an eNB in LTE, gNB in 5G, TRP, or the like.

It should be understood that, in some example embodiments, apparatus 10 may be comprised of an edge cloud server as a distributed computing system where the server and the radio node may be stand-alone apparatuses communicating with each other via a radio path or via a wired connection, or where they may be located in a same entity communicating via a wired connection. For instance, in certain example embodiments where apparatus 10 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a front-haul interface. The DU may be a logical node that includes a subset of the gNB functions, depending on the functional split option. It should be noted that one of ordinary skill in the art would understand that apparatus 10 may include components or features not shown in FIG. 9a. As illustrated in the example of FIG. 9a, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 9a, multiple processors may be utilized according to other example embodiments. For example, it should be understood that, in certain embodiments, apparatus 10 may include two or more processors that may form a multiprocessor system (e.g., in this case processor 12 may represent a multiprocessor) that may support multiprocessing. In some embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to management of communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15. In certain embodiments, the radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and/or the like. According to an example embodiment, the radio interface may include components, such as filters, converters (for example, digital-to-analog converters and the like), mappers, a Fast Fourier Transform (FFT) module, and/or the like, e.g., to generate symbols for transmission via one or more downlinks and to receive symbols (for example, via an uplink).

As such, transceiver 18 may be configured to modulate information on to a carrier waveform for transmission by the antenna(s) 15 and demodulate information received via the antenna(s) 15 for further processing by other elements of apparatus 10. In other example embodiments, transceiver 18 may be capable of transmitting and receiving signals or data directly. Additionally or alternatively, in some embodiments, apparatus 10 may include an input and/or output device (I/O device).

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some embodiments, processor 12 and memory 14 may be included in or may form a part of processing circuitry or control circuitry. In addition, in some embodiments, transceiver 18 may be included in or may form a part of transceiver circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to case an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 10 may be a network node or RAN node, such as a base station, access point, Node B, eNB, gNB, WLAN access point, TRP, or the like. For example, in some embodiments, apparatus 10 may be configured to perform one or more of the processes depicted in any of the flow charts or signaling diagrams described herein, such as those illustrated in FIG. 8a or 8b. In some embodiments, as discussed herein, apparatus 10 may be configured to perform a procedure relating to beam reporting, for example, for rank enhancement.

In one embodiment, apparatus 10 may be controlled by memory 14 and processor 12 to define or determine an enhanced beam reporting criteria and/or rule-set for UE beam reporting. For instance, the enhanced beam reporting criteria and/or rule-set may enable transmission rank enhancement with reduced latency and signaling overhead in single and/or multi-TRP scenarios. According to some embodiments, the enhanced beam reporting criteria and/or rule set may comprise one or more of the following conditions: spatial domain difference, simultaneous reception, power difference, and/or resource set pool (e.g., CORESET pool).

In an embodiment, apparatus 10 may be controlled by memory 14 and processor 12 to configure one or more UE(s) with the enhanced beam reporting criteria and/or rule-set. For example, apparatus 10 may be controlled by memory 14 and processor 12 to configure the UE(s) with one or more of the spatial domain difference condition, simultaneous reception condition, power difference condition, and/or resource set pool (e.g., CORESET pool) condition.

When configuring the UE(s) for the spatial domain difference condition, apparatus 10 may be controlled by memory 14 and processor 12 to configure the UE(s) to report up to K-best in terms of L1-RSRP and/or L1-signal-to-noise-and-interference-ratio (SINR) values of measured CSI resources that resources associated with channel measurements do not share the same ending point or crossing point reference resource(s) among the spatial QCL-chains of measured CSI resources. In an embodiment, the measured CSI resources may include NZP-CSI-RS and/or SSB. According to one example, apparatus 10 may be controlled by memory 14 and processor 12 to configure the UE(s) to assume that the spatial domain difference condition is a default operation mode for enhanced beam reporting. According to an embodiment, depending on the configured spatial QCL-chain for the measured CSI resource, the QCL-chain may include multiple offsets of spatial source for the measured CSI resource. In an alternative or additional embodiment, apparatus 10 may be controlled by memory 14 and processor 12 to configure the spatial-QCL-offset separately from the measured CSI resource. The spatial-QCL-offset defines the virtual ending point of the spatial QCL-chain computed from the measured resources to determine spatial difference of reference resource for the determination of beam reporting.

When configuring the simultaneous reception condition for beam reporting, apparatus 10 may be controlled by memory 14 and processor 12 to configure the UE(s) to report up to K-best in terms of L1-RSRP and/or L1-signal-to-noise-and-interference-ratio (SINR) values of different measured CSI resources for spatial multiplexing that can be simultaneously received by using multiple different RX antenna ports and/or UE antenna panels and/or spatial filters.

In an embodiment, when configuring the power difference condition, apparatus 10 may be controlled by memory 14 and processor 12 to configure the UE(s) to report up to K the measured CSI resources that are within the window between maximum and minimum values of reported signal quality, e.g., L1-RSRP or L1-SINR, is less or equal to configured threshold for the spatial power difference. Thus, the power difference condition may define the maximum allowed power difference between the maximum and minimum of measured signal quality values, e.g., L1-RSRP or L1-RSRP, for CSI resources to be reported conditioned under same QCL-source (end or crossing) or conditioned to not to be under same QCL-source (end or crossing). According to certain embodiments, apparatus 10 may be controlled by memory 14 and processor 12 to configure the power difference condition by RRC and/or MAC and/or physical layer signaling. In alternative embodiment, when configuring the power difference condition, apparatus 10 may be controlled by memory 14 and processor 12 to configure a specific reception threshold that defines the UE(s) to report up K-best measured signal quality values being above or equal to the power threshold. In an embodiment, apparatus 10 may be controlled by memory 14 and processor 12 to configure the threshold by RRC and/or MAC and/or physical layer signaling. In some embodiments, the difference of signal quality values within power window or signal quality values being above the reception threshold may also be expressed using the differential encoding with respect to the maximum signal quality value.

When configuring the resource set pool (or CORESET-pool) condition, apparatus 10 may be controlled by memory 14 and processor 12 to configure the UE(s) to report up to K-best measured CSI resources that do not share the same ending point or crossing point reference resource among the spatial QCL-chains and the ending point reference resources of QCL-chains should be associated with preconfigured TCI states of different resource sets (e.g., CORESETs) having different resource set parameter (e.g., CORESET Pool Index) values. In some embodiments, apparatus 10 may be controlled by memory 14 and processor 12 to configure any combination of the above-discussed criteria or conditions (except simultaneous reception) for enhanced beam reporting as UE RX antenna port and/or antenna panel specifically.

In one embodiment, when defining the enhanced beam reporting criteria, apparatus 10 may be controlled by memory 14 and processor 12 to define both default and fallback UE reporting procedures for enhanced beam reporting and, in this embodiment, to configure the UE(s) with the default and fallback reporting procedures. According to some embodiments, the default UE reporting procedure may include, when a UE determines enhanced beam reporting based on configured CSI resources and any of the above criteria/conditions are fulfilled, apparatus 10 may be controlled by memory 14 and processor 12 to configure the UE(s) to report the determined resources and their corresponding signal quality values by using existing CSI reporting format for the beam reporting. This indicates implicitly for a network that rank K may be achievable with multi-beam and/or multi-TRP transmission.

According to certain embodiments, the fallback UE reporting procedure may include, when a UE determines enhanced beam reporting based on configured CSI resources and any of the above criteria/conditions is/are not fulfilled, apparatus 10 may be controlled by memory 14 and processor 12 to configure the UE to report up to K times the same resource index. This indicates implicitly to apparatus 10 that UE rank enhancement is not achievable. In one example, apparatus 10 may be controlled by memory 14 and processor 12 to configure the UE(s) to repeat highest L1-RSRP NZP-CSI-RS resource index (CRI) or SSB index. For example, if K=4 and the UE can obtain, for example only max_rank=2, the UE may be configured to repeat first NZP-CSI-RS/SSB resource index two times and second NZP-CSI-RS two times in the report, that provide the rank similarly in case max_rank=3, UE may list the different CSI-RS indices first and repeat, e.g., the last or any index so that up to K=4 is reported. This informs apparatus 10 implicitly of the obtainable rank, and can be similarly expanded to any number K.

Figure 9B:
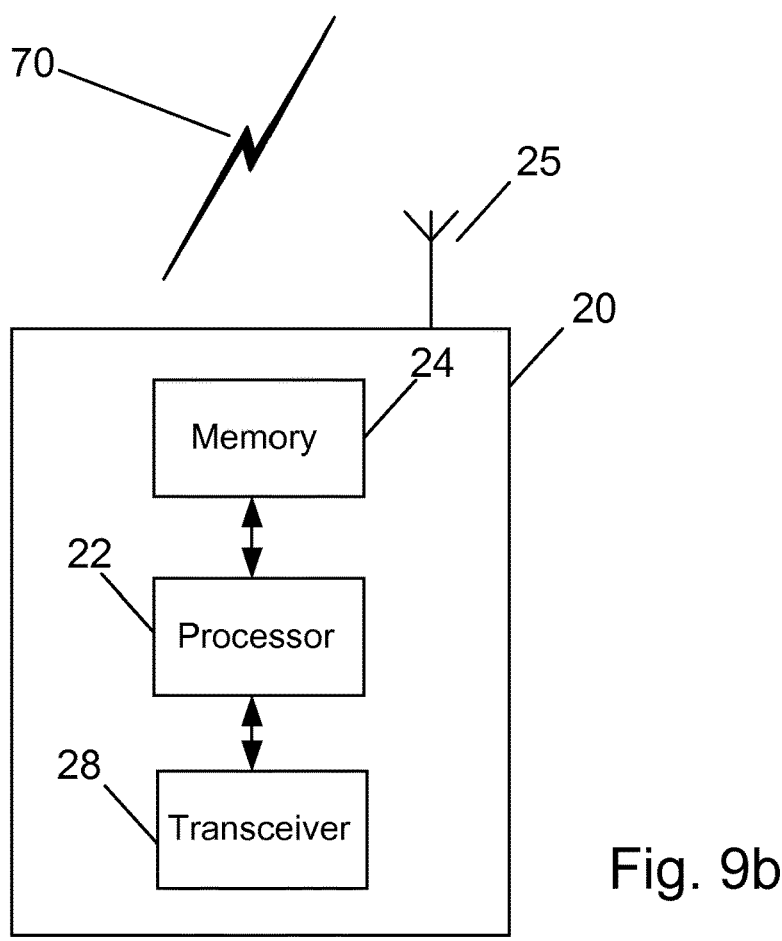
FIG. 9b illustrates an example block diagram of an apparatus, according to an embodiment.

FIG. 9b illustrates an example of an apparatus 20 according to another embodiment. In an embodiment, apparatus 20 may be a node or element in a communications network or associated with such a network, such as a UE, mobile equipment (ME), mobile station, mobile device, stationary device, IoT device, or other device. As described herein, UE may alternatively be referred to as, for example, a mobile station, mobile equipment, mobile unit, mobile device, user device, subscriber station, wireless terminal, tablet, smart phone, IoT device, sensor or NB-IoT device, or the like. As one example, apparatus 20 may be implemented in, for instance, a wireless handheld device, a wireless plug-in accessory, or the like.

In some example embodiments, apparatus 20 may include one or more processors, one or more computer-readable storage medium (for example, memory, storage, or the like), one or more radio access components (for example, a modem, a transceiver, or the like), and/or a user interface. In some embodiments, apparatus 20 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 20 may include components or features not shown in FIG. 9b.

As illustrated in the example of FIG. 9b, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 9b, multiple processors may be utilized according to other example embodiments. For example, it should be understood that, in certain embodiments, apparatus 20 may include two or more processors that may form a multiprocessor system (e.g., in this case processor 22 may represent a multiprocessor) that may support multiprocessing. In some embodiments, the multi-processor system may be tightly coupled or loosely coupled (e.g., to form a computer cluster).

Processor 22 may perform functions associated with the operation of apparatus 20 including, as some non-limiting examples, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some embodiments, apparatus 20 may also include or be coupled to one or more antennas 25 for receiving a downlink signal and/or for transmitting via an uplink from apparatus 20. According to certain embodiments, apparatus 20 may further include a transceiver 28 configured to transmit and receive information. In one example, the transceiver 28 may also include a radio interface (e.g., a modem) coupled to the antenna 25. In some embodiments, the radio interface may correspond to a plurality of radio access technologies including one or more of GSM, LTE, LTE-A, 5G, NR, WLAN, NB-IoT, Bluetooth, BT-LE, NFC, RFID, UWB, and the like. In further example embodiments, the radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other example embodiments, transceiver 28 may be capable of transmitting and receiving signals or data directly. Additionally or alternatively, in some embodiments, apparatus 20 may include an input and/or output device (I/O device). In certain embodiments, apparatus 20 may further include a user interface, such as a graphical user interface or touchscreen.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an example embodiment, apparatus 20 may optionally be configured to communicate with apparatus 10 via a wireless or wired communications link 70 according to any radio access technology, such as NR.

According to some embodiments, processor 22 and/or memory 24 may be included in or may form a part of processing circuitry or control circuitry. In addition, in some embodiments, transceiver 28 may be included in or may form a part of transceiving circuitry.

As discussed above, according to some embodiments, apparatus 20 may be a UE, mobile device, mobile station, ME, IoT device and/or NB-IoT device, for example. According to certain embodiments, apparatus 20 may be controlled by memory 24 and processor 22 to perform the functions associated with example embodiments described herein. For example, in some embodiments, apparatus 20 may be configured to perform one or more of the processes depicted in any of the flow charts or signaling diagrams described herein, such as those illustrated in FIG. 8a or 8b. In certain embodiments, apparatus 20 may include or represent a UE and may be configured to perform a procedure relating to beam reporting, for example, for rank enhancement.

In certain embodiments, apparatus 20 may be controlled by memory 24 and processor 22 to receive or determine a configuration of an enhanced beam reporting criteria and/or rule-set for UE beam reporting. According to an example, the enhanced beam reporting criteria and/or rule-set may enable or be used for transmission rank enhancement with reduced latency and signaling overhead in single and/or multi-TRP scenarios. In some embodiments, the enhanced beam reporting criteria and/or rule set configuration may comprise one or more of the following conditions: spatial domain difference, simultaneous reception, power difference, and/or resource set pool (e.g., CORESET pool).

According to one embodiment, apparatus 20 may be controlled by memory 24 and processor 22 to prepare a beam report according to the configuration of the enhanced beam reporting criteria and/or rule-set. In an embodiment, when the spatial domain difference condition is configured for the enhanced beam reporting, apparatus 20 may be controlled by memory 24 and processor 22 to determine to report up to K-best measured CSI resources that do not share the same ending point or crossing point reference resource(s) among the spatial QCL-chains of measured CSI resources. In an embodiment, the measured CSI resources may include NZP-CSI-RS and/or SSB.

According to one example, the spatial domain difference condition may be configured as a default operation mode for enhanced beam reporting. According to an embodiment, depending on the configured spatial QCL-chain for the measured CSI resource, the QCL-chain may include multiple offsets of spatial source for the measured CSI resource. In an alternative or additional embodiment, the spatial-QCL-offset may be configured separately from the measured CSI resource. The spatial-QCL-offset defines the virtual ending point of the spatial QCL-chain chain computed from the measured resources to determine spatial difference of reference resource for the determination of beam reporting.

In one embodiment, when the simultaneous reception condition for beam reporting is configured, apparatus 20 may be controlled by memory 24 and processor 22 to determine to report up to K different measured CSI resources for spatial multiplexing that can be simultaneously received by using multiple different RX antenna ports and/or UE antenna panels and/or spatial filters.

In an embodiment, when the power difference condition is configured for the enhanced beam reporting, apparatus 20 may be controlled by memory 24 and processor 22 to determine to report up to K the measured CSI resources that are within the window between maximum and minimum values of reported signal quality, e.g., L1-RSRP or L1-SINR, is less or equal to configured threshold for the spatial power difference. Thus, the power difference condition may define the maximum allowed power difference between the maximum and minimum of measured signal quality values, e.g., L1-RSRP or L1-RSRP, for CSI resources to be reported conditioned under same QCL-source (end or crossing) or conditioned to not to be under same QCL-source (end or crossing). In an embodiment, apparatus 20 may be controlled by memory 24 and processor 22 to receive the configuration of the power difference condition by RRC and/or MAC and/or physical layer signaling. In alternative embodiment, when receiving the configuration of the power difference condition, apparatus 20 may be controlled by memory 24 and processor 22 to receive a configuration for a specific reception threshold for reporting up K-best measured signal quality values being above or equal to the power threshold. In an embodiment, the configuration for the threshold may be received by RRC and/or MAC and/or physical layer signaling. In some embodiments, the difference of signal quality values within power window or signal quality values being above the reception threshold may also be expressed using the differential encoding with respect to the maximum signal quality value.

According to an embodiment, when the resource set pool (or CORESET-pool) condition is configured for the enhanced beam reporting, the configuration of the power difference condition determine to report up to K-best measured CSI resources that do not share the same ending point or crossing point reference resource among the spatial QCL-chains and the ending point reference resources of QCL-chains should be associated with preconfigured TCI states of different resource sets (e.g., CORESETs) having different resource set parameter (e.g., CORESET Pool Index) values.

In some embodiments, when receiving the configuration of the enhanced beam reporting criteria, apparatus 20 may be controlled by memory 24 and processor 22 to receive any combination of the above-discussed criteria or conditions (except simultaneous reception) for enhanced beam reporting as UE RX antenna port and/or antenna panel specifically.

In one embodiment, apparatus 20 may be controlled by memory 24 and processor 22 to receive both default and fallback UE reporting procedures for enhanced beam reporting.

According to some embodiments, for the default UE reporting procedure, when it is determined that enhanced beam reporting based on configured CSI resources and any of the above criteria/conditions are fulfilled, apparatus 20 may be controlled by memory 24 and processor 22 to determine to report the determined resources and their corresponding signal quality values by using existing CSI reporting format for the beam reporting. This indicates implicitly for a network that rank K may be achievable with multi-beam and/or multi-TRP transmission.

According to certain embodiments, for the fallback UE reporting procedure, when it is determined that enhanced beam reporting based on configured CSI resources and any of the above criteria/conditions is/are not fulfilled, apparatus 20 may be controlled by memory 24 and processor 22 to determine to report up to K times the same resource index. This indicates implicitly to the network that UE rank enhancement is not achievable. In one example, apparatus 20 may be controlled by memory 24 and processor 22 to determine to repeat highest L1-RSRP NZP-CSI-RS resource index (CRI) or SSB index. For example, if K=4 and, for example only max_rank=2 can be obtained, apparatus 20 may be controlled by memory 24 and processor 22 to determine to repeat first NZP-CSI-RS/SSB resource index two times and second NZP-CSI-RS two times in the report, that provide the rank similarly in case max_rank=3, and to list the different CSI-RS indices first and repeat, e.g., the last or any index so that up to K=4 is reported. This informs the network implicitly of the obtainable rank, and can be similarly expanded to any number K.

In one embodiment, apparatus 20 may be controlled by memory 24 and processor 22 to provide or transmit a beam report, to the network, according to the enhanced beam reporting criteria.

Therefore, certain example embodiments provide several technological improvements, enhancements, and/or advantages over existing technological processes and constitute an improvement at least to the technological field of wireless network control and management. For example, certain embodiments may be directed to an enhanced beam reporting criteria that imposes a UE to report measured CSI resource that do not share same spatial source resources. As a result, the reported CSI resources can be enable transmission rank enhancement with reduced latency and system overhead in terms of reference signal transmission and beam reporting. Accordingly, the use of certain example embodiments results in improved functioning of communications networks and their nodes, such as base stations, eNBs, gNBs, TRPs, and/or UEs or mobile stations.

In some example embodiments, the functionality of any of the methods, processes, signaling diagrams, algorithms or flow charts described herein may be implemented by software and/or computer program code or portions of code stored in memory or other computer readable or tangible media, and executed by a processor.

In some example embodiments, an apparatus may be included or be associated with at least one software application, module, unit or entity configured as arithmetic operation(s), or as a program or portions of it (including an added or updated software routine), executed by at least one operation processor. Programs, also called program products or computer programs, including software routines, applets and macros, may be stored in any apparatus-readable data storage medium and may include program instructions to perform particular tasks.

A computer program product may include one or more computer-executable components which, when the program is run, are configured to carry out some example embodiments. The one or more computer-executable components may be at least one software code or portions of code. Modifications and configurations for implementing the functionality of an example embodiment may be performed as routine(s), which may be implemented as added or updated software routine(s). In one example, software routine(s) may be downloaded into the apparatus.

As an example, software or computer program code or portions of code may be in source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and/or software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus, for example through the use of an application specific integrated circuit (ASIC), a programmable gate array (PGA), a field programmable gate array (FPGA), or any other combination of hardware and software. In yet another example embodiment, the functionality may be implemented as a signal, such as a non-tangible means, that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, which may include at least a memory for providing storage capacity used for arithmetic operation(s) and/or an operation processor for executing the arithmetic operation(s).

One having ordinary skill in the art will readily understand that the example embodiments as discussed above may be practiced with procedures in a different order, and/or with hardware elements in configurations which are different than those which are disclosed. Therefore, although some embodiments have been described based upon these example embodiments, it would be apparent to those of skill in the art that certain modifications, variations, and alternative constructions would be apparent, while remaining within the spirit and scope of example embodiments.

The invention claimed is:

1. An apparatus, comprising:
   at least one processor; and
   at least one memory comprising computer program code,
   the at least one memory and computer program code configured, with the at least one processor, to cause the apparatus at least to:
   define beam reporting criteria for user equipment beam reporting;
   configure at least one user equipment with the beam reporting criteria; and
   receive at least one beam report, from the at least one user equipment, according to the beam reporting criteria configured to the at least one user equipment;
   wherein the configuring comprises configuring the at least one user equipment with a configuration for a user equipment beam reporting procedure for the beam reporting that comprises, when the at least one user equipment determines the beam reporting based on configured channel state information resources and any of the beam reporting criteria are fulfilled, configuring the at least one user equipment to report measured channel state information resources and their corresponding signal quality values by using a channel state information reporting format for the beam reporting.

2. The apparatus according to claim 1,
   wherein the beam reporting criteria comprises at least one of the following conditions: spatial domain difference, simultaneous reception, power difference, or resource set pool, and
   wherein the configuring comprises configuring the at least one user equipment with one or more of the spatial domain difference condition, simultaneous reception condition, power difference condition, or resource set pool condition.

3. The apparatus according to claim 2, wherein, when configuring the at least one user equipment for the spatial domain difference condition, the configuring comprises configuring the at least one user equipment to report up to K-best, in terms of L1-reference signal received power and/or L1-signal-to-noise-and-interference-ratio, values of measured channel state information resources that are associated with channel measurements and do not share a same ending point or crossing point reference resource among spatial quasi-co-location-chains of measured channel state information resources.

4. The apparatus according to claim 2, wherein, when configuring the at least one user equipment for the simultaneous reception condition, the configuring comprises configuring the at least one user equipment to report up to K-best, in terms of L1-reference signal received power and/or L1-signal-to-noise-and-interference-ratio, values of different measured channel state information resources for spatial multiplexing that are simultaneously received by using multiple different receiving antenna ports, user equipment antenna panels, or spatial filters.

5. The apparatus according to claim 2, wherein, when configuring the at least one user equipment for the power difference condition, the configuring comprises configuring the at least one user equipment to report up to K-best, in terms of L1-reference signal received power and/or L1-signal-to-noise-and-interference-ratio, values of measured channel state information resources that are within a window between maximum and minimum values of reported signal quality.

6. The apparatus according to claim 2, wherein, when configuring the resource set pool condition, the configuring comprises configuring the at least one user equipment to report up to K-best measured channel state information resources that do not share a same ending point or crossing point reference resource among spatial quasi-co-location-chains and ending point reference resources of the quasi-co-location-chains are associated with preconfigured TCI states of different resource sets having different resource set parameter values.

7. An apparatus, comprising:
   at least one processor; and
   at least one memory comprising computer program code,
   the at least one memory and computer program code configured, with the at least one processor, to cause the apparatus at least to:
   determine a configuration of beam reporting criteria for user equipment beam reporting; and
   transmit a beam report, to a network, according to the beam reporting criteria;
   wherein the determining comprises receiving a configuration for a user equipment beam reporting procedure for the beam reporting that comprises, when the apparatus determines the beam reporting based on configured channel state information resources and any of the beam reporting criteria are fulfilled, the transmitting comprises reporting measured channel state information resources and their corresponding signal quality values by using a channel state information reporting format for the beam reporting.

8. The apparatus according to claim 7, wherein the beam reporting criteria comprises at least one of the following conditions: spatial domain difference, simultaneous reception, power difference, or resource set pool.

9. The apparatus according to claim 8, wherein, when the spatial domain difference condition is configured for the beam reporting, the determining comprises determining to report up to K-best, in terms of L1-reference signal received power and/or L1-signal-to-noise-and-interference-ratio, values of measured channel state information resources that are associated with channel measurements and do not share a same ending point or crossing point reference resource among spatial quasi-co-location-chains of measured channel state information resources.

10. The apparatus according to claim 8, wherein, when the simultaneous reception condition for beam reporting is configured, the determining comprises determining to report up to K-best different measured channel state information resources for spatial multiplexing that are simultaneously received by using multiple different reception antenna ports, user equipment antenna panels, or spatial filters.

11. The apparatus according to claim 8, wherein, when the power difference condition is configured for the beam reporting, the determining comprises determining to report up to K-best, in terms of L1-reference signal received power and/or L1-signal-to-noise-and-interference-ratio, values of the measured channel state information resources that are within a window between maximum and minimum values of reported signal quality.

12. The apparatus according to claim 8, wherein, when the resource set pool condition is configured for the beam reporting, the determining comprises determining to report up to K-best, in terms of L1-reference signal received power and/or L1-signal-to-noise-and-interference-ratio, values of measured channel state information resources that do not share a same ending point or crossing point reference resource among spatial quasi-co-location-chains and ending point reference resources of quasi-co-location-chains are associated with preconfigured TCI states of different resource sets having different resource set parameter values.

13. An apparatus, comprising:
  at least one processor; and
  at least one memory comprising computer program code, the at least one memory and computer program code configured, with the at least one processor, to cause the apparatus at least to:
  determine a configuration of beam reporting criteria for user equipment beam reporting; and
  transmit a beam report, to a network, according to the beam reporting criteria;
  wherein the determining comprises receiving a configuration for a user equipment beam reporting procedure for the beam reporting that comprises, when the apparatus determines the beam reporting based on configured channel state information resources and any of the beam reporting criteria are not fulfilled, the transmitting comprises reporting up to an integer value times the same resource index.

14. The apparatus according to claim 13, wherein the beam reporting criteria comprises at least one of the following conditions: spatial domain difference, simultaneous reception, power difference, or resource set pool.

15. The apparatus according to claim 14, wherein, when the spatial domain difference condition is configured for the beam reporting, the determining comprises determining to report up to K-best, in terms of L1-reference signal received power and/or L1-signal-to-noise-and-interference-ratio, values of measured channel state information resources that are associated with channel measurements and do not share a same ending point or crossing point reference resource among spatial quasi-co-location-chains of measured channel state information resources.

16. The apparatus according to claim 14, wherein, when the simultaneous reception condition for beam reporting is configured, the determining comprises determining to report up to K-best different measured channel state information resources for spatial multiplexing that are simultaneously received by using multiple different reception antenna ports, user equipment antenna panels, or spatial filters.

17. The apparatus according to claim 14, wherein, when the power difference condition is configured for the beam reporting, the determining comprises determining to report up to K-best, in terms of L1-reference signal received power and/or L1-signal-to-noise-and-interference-ratio, values of the measured channel state information resources that are within a window between maximum and minimum values of reported signal quality.

18. The apparatus according to claim 14, wherein, when the resource set pool condition is configured for the beam reporting, the determining comprises determining to report up to K-best, in terms of L1-reference signal received power and/or L1-signal-to-noise-and-interference-ratio, values of measured channel state information resources that do not share a same ending point or crossing point reference resource among spatial quasi-co-location-chains and ending point reference resources of quasi-co-location-chains are associated with preconfigured TCI states of different resource sets having different resource set parameter values.

* * * * *